United States Patent
Hall et al.

(10) Patent No.: US 7,526,502 B2
(45) Date of Patent: Apr. 28, 2009

(54) DYNAMIC CALL SITE BINDING

(75) Inventors: Simon Jeremy Hall, Seattle, WA (US); George Harold Bosworth, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 164 days.

(21) Appl. No.: 10/938,401

(22) Filed: Sep. 10, 2004

(65) Prior Publication Data

US 2006/0059195 A1    Mar. 16, 2006

(51) Int. Cl.
    *G06F 17/00* (2006.01)
(52) U.S. Cl. .............................. 707/103 Y; 707/104.1; 710/1; 717/151
(58) Field of Classification Search ............... 707/103 Y
    See application file for complete search history.

(56) References Cited

U.S. PATENT DOCUMENTS

| | | | |
|---|---|---|---|
| 5,421,016 A | 5/1995 | Conner et al. | |
| 5,764,958 A | 6/1998 | Coskun | |
| 6,317,796 B1 * | 11/2001 | Bak et al. | 719/315 |
| 6,405,263 B1 | 6/2002 | Conner et al. | |
| 6,438,744 B2 | 8/2002 | Toutonghi et al. | |
| 6,532,531 B1 * | 3/2003 | O'Connor et al. | 712/202 |
| 6,714,991 B1 * | 3/2004 | Bak et al. | 719/316 |
| 7,089,540 B2 * | 8/2006 | Ogasawara | 717/140 |
| 2002/0144060 A1 | 10/2002 | Stoodley | |
| 2003/0172198 A1 * | 9/2003 | Tiwary et al. | 710/1 |
| 2004/0154008 A1 * | 8/2004 | Bak et al. | 717/151 |
| 2004/0244009 A1 * | 12/2004 | Bak et al. | 719/315 |
| 2005/0055541 A1 * | 3/2005 | Aamodt et al. | 712/217 |

OTHER PUBLICATIONS

"Reducing Virtual Call Overheads in a Java VM Just-in-Time Compiler", Lee et al., Computer Architecture News, Mar. 2000, vol. 28, No. 1, pp. 21-33.
"Object-Oriented Architectural Support for a Java Processor", Vijaykrishnan et al., E. Jul (Ed.): ECOOP'98, LNCS 1445, 1998, pp. 330-355.
"Optimizing Dynamically-Typed Object-Oriented Languages With Polymorphic Inline Caches", Holzl et al., P. America (Ed.): ECOOP'91, LNCS 512, 1991, pp. 21-38.
"The Complexity of Type Analysis of Object Oriented Programs", Gil et al., E. Jul (Ed.): ECOOP'98, LNCS 1445, 1998, pp. 601-634.
"Efficient Dynamic Dispatch without Virtual Function Tables. The SmallEiffel Compiler", Zendra et al., SIGPLAN Notices, Oct. 1997, vol. 32, No. 10, pp. 125-141.
"Evolution of Object Behavior Using Context Relations", Seiter et al., IEEE Transactions on Software Engineering, Jan. 1998, vol. 24, No. 1, pp. 79-92.

* cited by examiner

*Primary Examiner*—Truong Cam Y
*Assistant Examiner*—Shyue Jiunn Hwa
(74) *Attorney, Agent, or Firm*—Lee & Hayes, PLLC

(57) ABSTRACT

Dynamic call site binding includes determining, based on a context of a call received from a call site, a pointer to target code to be executed to carry out the call. A cache entry is generated, for use with subsequent calls from the call site, the cache entry associating the context of the call with the pointer to the target code. The cache entry is saved as being associated with the call site.

19 Claims, 8 Drawing Sheets

DYNAMIC CALL SITE BINDING

TECHNICAL FIELD

This invention relates to object-oriented programming, and particularly to dynamic call site binding.

BACKGROUND

Object-oriented programming generally refers to a technology for, or way of writing, computer programs that encapsulates data to be operated on and the method(s) that operate on that data into a single entity referred to as an object. A definition of an object is typically referred to as a type or class, and a specific instance of a type or class is referred to as the object. This "creation" of an object is also referred to as instantiation of the type.

One benefit to object-oriented programming is that types can be created based on other types. A type can be defined as inheriting or deriving from another type, which allows the type to inherit all of the methods of that other (or "parent") type. Thus, the type does not need to redefine all of the methods that were defined by the other type, rather it can simply inherit from that other type. This inheritance can result in a type inheritance hierarchy of two or more types (generally, there is no limit as to how many types can be in the inheritance hierarchy). For example, a first type can inherit from a second type, which can inherit from a third type, which can inherit from a fourth type. The first type then includes all of the methods that were defined by the second, third, and fourth types.

In addition to inheriting the methods of the other type, a type can also define new methods and override methods that were defined by the other type. For example, assume that there is a type "Shape" which defines a method "Draw" for drawing the shape and a method "Fill" for filling the shape with a texture. A type "Circle" can inherit from the type "Shape", leave its "Fill" method unchanged, but override its "Draw" method to be specific instructions for drawing a circle in a particular way.

Methods that can be overridden are often referred to as "virtual methods" because the particular code that will be executed for such a method varies based on the type of the object in the inheritance hierarchy that the method is being called on. The determination of the appropriate code to execute when a virtual method is invoked is oftentimes referred to as "virtual method dispatching". Typically, virtual method dispatching is handled using a "virtual table" or "vtable". In a traditional virtual table, each method on a type is assigned a number starting from zero and monotonically increasing by one. The numbers assigned from previous types are maintained on a new type that derives from that previous type. For example, if a type defines two new methods and inherits from another type that had defined four methods (assigned numbers 0, 1, 2, and 3), the two new methods on the type would be assigned numbers 4 and 5.

The virtual table has a series of pointers in it that each point to code to be executed in order to carry out one of the methods on an object. These pointers are in the same order as the numbers assigned to the methods of the object's type. For example, if the third method on a type "Shape" is the "Draw" method and is assigned the number 2, then the third pointer in the series of pointers is the pointer to the code to be executed in order to carry out the "Draw" method on an object of type "Shape."

When a type overrides a method on another type, the type adheres to this numbering scheme and order of pointers in the series of pointers. The type simply changes the pointer at the proper location in the series of pointers to point to the new code that the type is using for the method. Following the previous example, if a type "Circle" inherited from the type "Shape" and desired to override the "Draw" method, then the third pointer in the series of pointers would be changed to point to the new code to be executed in order to carry out the "Draw" method on an object of type "Circle." By having all types in the type inheritance hierarchy adhere to this same numbering scheme, the methods on all of the types can be easily invoked. For example, the "Draw" method would always be assigned the number 2, regardless of which object type in the hierarchy the method was being called on, and regardless of how many times (if any) the method had been overridden.

One problem with these traditional virtual tables is the storage space that they require. When a type inherits from another type, it copies all of the methods from that other type, which can result in a large number of methods. So, for example, if a first type defines 10 methods, a second type inherits from the first type and defines 10 additional methods, a third type inherits from the second type and defines yet another 10 additional methods, and a fourth type inherits from the third type and defines still another 10 methods, then the fourth type has 40 methods defined on it, the third type has 30 methods defined on it, the second type has 20 methods defined on it, and the first type has 10 methods defined on it. There are only 40 total methods, but with all four types defined there are 100 method pointers stored (40+30+20+10). This problem is only exacerbated as type inheritance hierarchies grow longer.

A particularly troublesome issue with the size of such virtual tables is the situation where only a couple of the methods are commonly used. Thus, following the previous example, if only two methods on the fourth type are commonly used, then a significant amount of storage space is being devoted to methods that are not being used (that is, the storage space required for the 38 out of 40 methods not commonly being used).

Thus, it would be beneficial to have a way to reduce the storage space requirements for virtual method dispatching.

SUMMARY

Dynamic call site binding is described herein.

In accordance with certain aspects, a pointer to target code to be executed to carry out a call received from a call site is determined based on a context of the call. A cache entry associating the context of the call with the pointer to the target code is generated for use with subsequent calls from the call site. The cache entry is saved as being associated with the call site.

In accordance with other aspects, one or more data structures are generated to replace a virtual table for use with virtual method dispatching. Implementation tables are used that include pointers to code to be executed for methods defined by a type, and slot maps are used that include entries mapping conceptual virtual table slot numbers, both for the type and for interface methods implemented by the type, to locations in the implementation tables.

BRIEF DESCRIPTION OF THE DRAWINGS

The same numbers are used throughout the document to reference like components and/or features.

DETAILED DESCRIPTION

Dynamic call site binding is described herein. In accordance with certain aspects, call sites are associated with particular target code based on the context of the call site. A variety of different context information can be used to determine which target code is associated with a particular call site. In accordance with other aspects, the information maintained in virtual tables to support virtual method dispatching is consolidated, reducing the storage requirements for such virtual tables.

Figure 1:
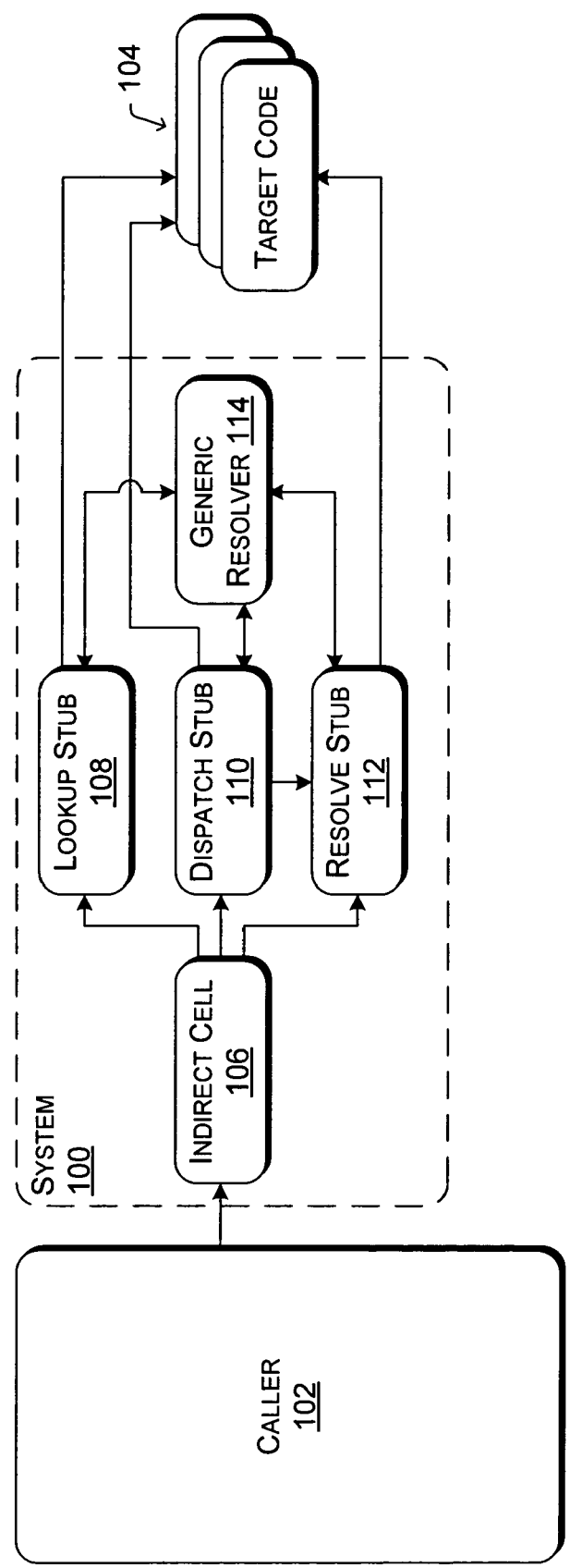
FIG. 1 illustrates an example system employing dynamic call site binding.

FIG. 1 illustrates an example system 100 employing dynamic call site binding. Generally, during operation of system 100, a call site in caller 102 makes a call to some other code (e.g., invokes a method, function, procedure, etc.). Based on the context of the call, system 100 identifies and executes particular target code 104 that is to be executed for this particular call and this particular context. This particular target code 104 can thus be viewed as being bound to the call site and context for this particular call.

In certain embodiments, system 100 is part of the operating system executing on a computing device. System 100 can be part of any of a variety of different operating systems, such as any of the Windows® operating systems available from Microsoft Corp. of Redmond, Wash. System 100 can also be part of a separate component or program that is designed to work with a particular operating system or any operating system. For example, system 100 may be part of the Common Language Runtime (CLR) used by the Microsoft .NET™ Framework.

System 100 includes an indirect cell 106, a lookup stub 108, a dispatch stub 110, a resolve stub 112, and a generic resolver 114. In the illustrated example of FIG. 1, a system 100 is associated with each call site in caller 102. Caller 102 is a set of instructions that can execute on a computing device. The set of instructions can be, for example, a program or a portion of a program. In certain implementations, the caller 102 is part of an "assembly", which is a collection of one or more files that are versioned and deployed as a unit. Once deployed, the assembly can be a caller 102.

Each call site is a particular line or location in caller 102. Examples of call sites include calls to virtual methods, a call to lookup an inheritance chain for casting, a call to another assembly or set of instructions, and so forth. Caller 102 may contain any number of call sites.

Indirect cell 106 is associated with a particular call site, and is a pointer to one of the three stubs 108, 110, or 112. Which of these stubs indirect cell 106 points to at any particular time can vary, as discussed in more detail below. When a call is made from a call site in caller 102, indirect cell 106 invokes whichever of the three stubs 108, 110, or 112 it is pointing to at the time the call is made.

Each of the stubs 108, 110, and 112 is a set of instructions (e.g., written in machine code). Initially, when caller 102 begins execution, an indirect cell 106 and lookup stub 108 are created for each call site in caller 102. Indirect cell 106 and lookup stub 108 can be created, for example, by an operating system that is executing caller 102. The stubs 108, 110, and 112 identify, or assist in identifying, the proper target code 104 to carry out a call having a particular context. The target code 104 is the code to be executed for a particular context of the call site, as discussed in more detail below.

The context of the call can vary in different embodiments. In one embodiment, system 100 is used to implement virtual tables (also referred to as vtables) for supporting virtual method dispatching. In this embodiment, the context of a call is the object on which the virtual method is being called. For example, if the call were a call to a method y of an object x, then the context of the call would be the object x. In other embodiments, other context information can be used, such as an identity of caller 102, the state of the thread or process in which caller 102 is being executed, an identity of the thread or process in which caller 102 is being executed, an identity of the user of caller 102, the current time and/or date, and so forth.

In situations where none of the stubs 108, 110, or 112 identifies the proper target code 104, generic resolver 114 is invoked to determine the proper target code 104. An indication of the proper target code 104 is then used to generate a new dispatch stub 110 or identify an existing stub 110, to which indirect cell 106 may be directed, or may be returned to resolve stub 112, so that the new stub 110 or updated stub 112 can identify the proper target code 104 for subsequent calls from this same call site having the same context.

Target code 104 is a set of instructions that are to be executed in response to the call site being executed with a particular context. By executing target code 104, the call from the call site is carried out—whatever operation was requested by the call is carried out by executing target code 104. This set of instructions represents the target of the call site for a given context.

System 100 assumes that the majority of the time, a call from a particular call site will have the same context each time the call is made. Thus, the first time that a call is made from a call site, system 100 determines the proper target code 104 and then saves the context and target code 104 for subsequent calls from that call site. Thus, the target code for a subsequent call from that call site with the same context can be quickly identified. If the context has changed, then an additional lookup process is performed.

Figure 2:
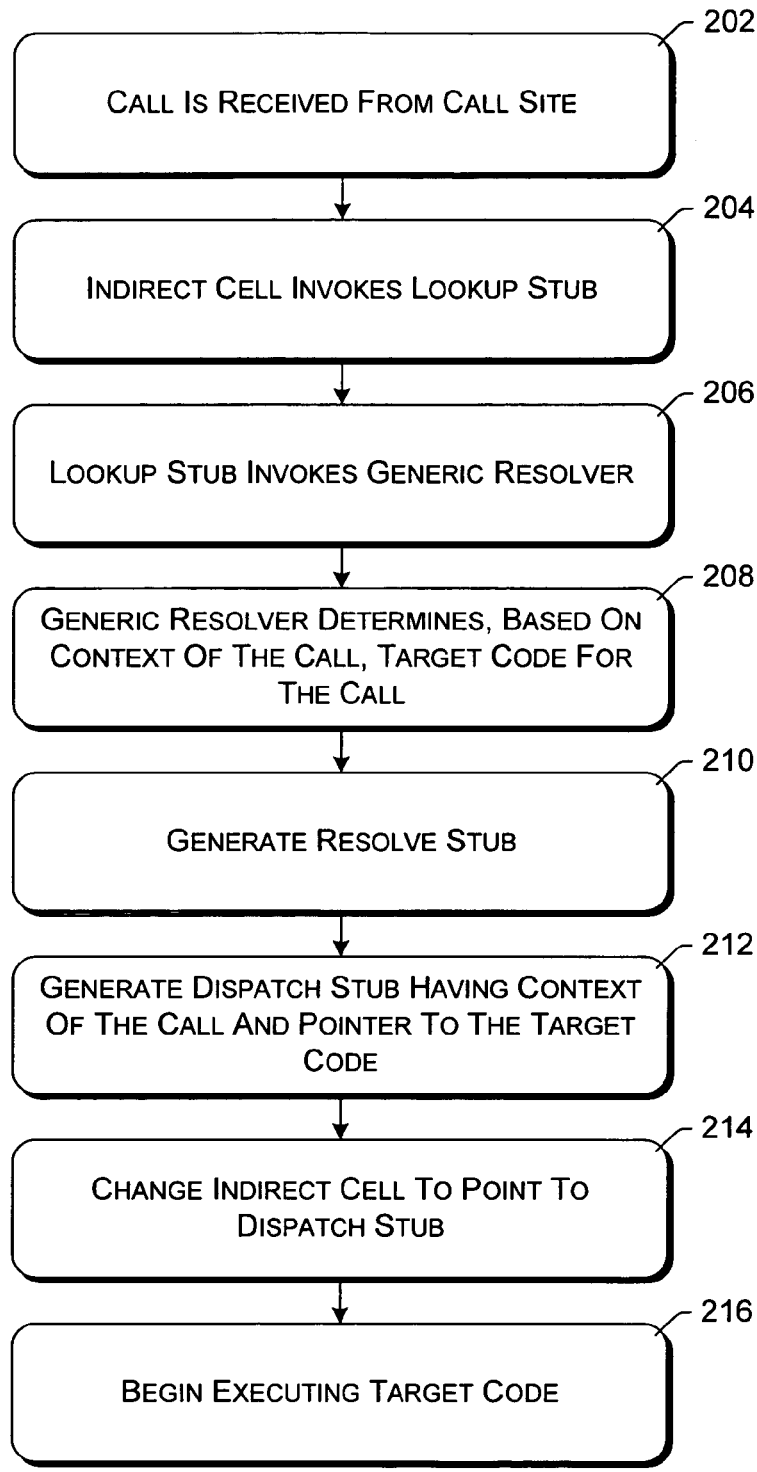
FIG. 2 is a flowchart illustrating the example operation of a system the first time that a call site is executed.
Figure 3:
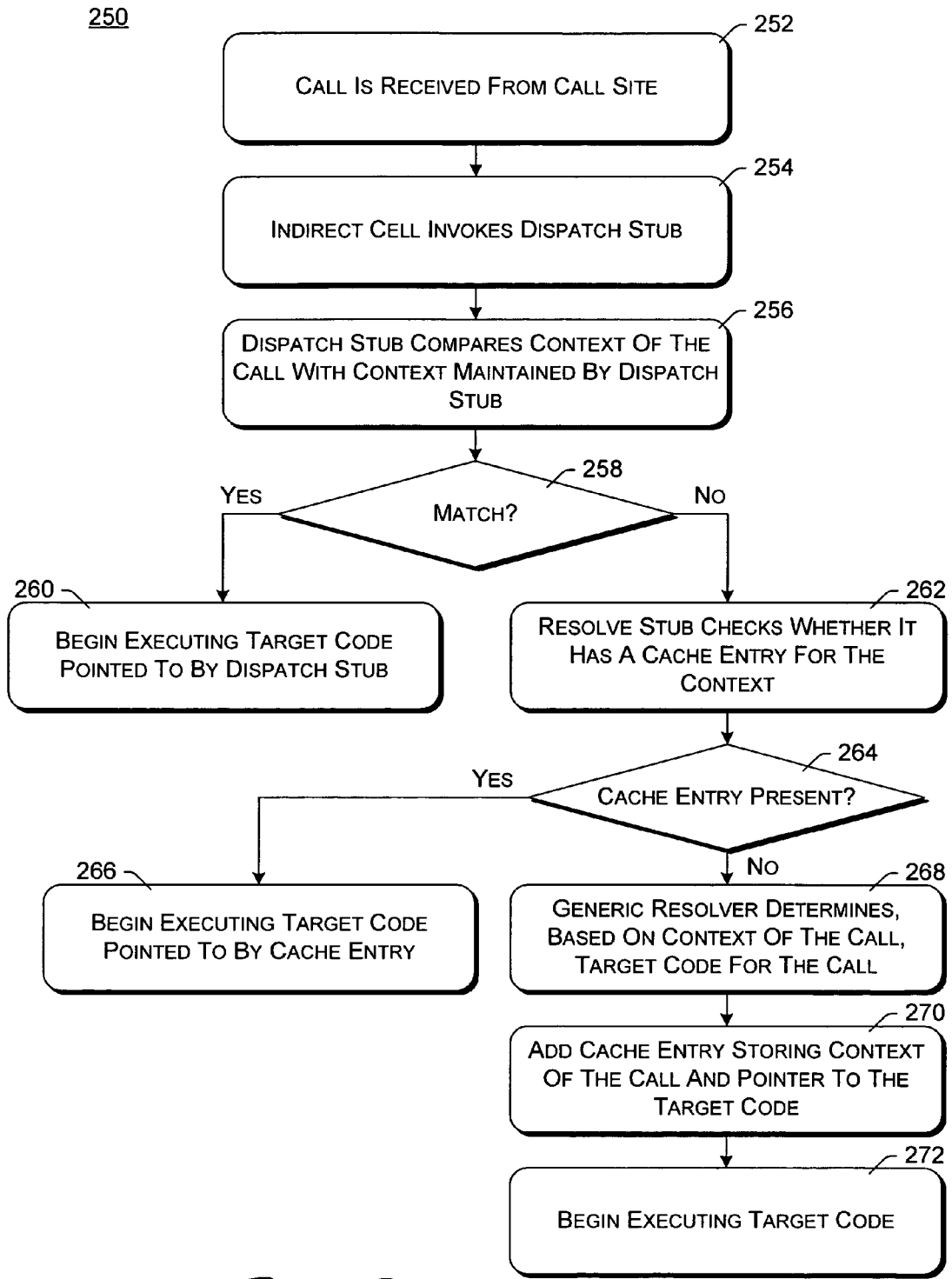
FIG. 3 is a flowchart illustrating the example operation of a system the second and subsequent times that a call site is executed.

The operation of system 100 is discussed in more detail below with reference to FIGS. 2 and 3. FIG. 2 is a flowchart illustrating the example operation of system 100 the first time that a call site is executed, and FIG. 3 is a flowchart illustrating the example operation of system 100 the second and subsequent times that the call site is executed. FIGS. 2 and 3 are typically performed in software, although alternatively they may be performed in firmware, hardware, or a combination of software, firmware, and/or hardware.

In FIG. 2, process 200 is shown illustrating the example operation of system 100 the first time that a call site is executed. Initially, the call is received from the call site (act 202). When the call is made, the operating system accesses indirect cell 106 to identify one of stubs 108, 110, and 112. The first time that a call site is executed, indirect cell 106 points to lookup stub 108, so indirect cell 106 invokes lookup stub 108 (act 204). Indirect cell 106 can be, for example, a pointer to lookup stub 108 so that execution of lookup stub 108 begins in response to the call being received from the call site. Lookup stub 108 invokes generic resolver 114 (act 206), which determines the target code for the call based on the context of the call (act 208). As discussed above, the context of the call can vary in different embodiments.

In certain embodiments, where system 100 is used to perform the function(s) of a virtual table for supporting virtual method dispatching, generic resolver 114 analyzes the context of the call to determine the proper target code 104 for that context. Given that, in object-oriented programming, a type can inherit methods from another type, and that as part of such inheritance methods of the type inherited from can be replaced with new methods, some analysis may be necessary to determine the proper target code 104 for that context. The exact nature of this analysis will vary based on the manner in which the virtual table, or other data structure(s) that replaces the virtual table, is implemented. An example set of such data structures, which is more consolidated than a traditional virtual table, and the analysis followed in determining the proper target code 104 for a particular context using such data structures, is discussed in more detail below.

Once generic resolver 114 identifies the proper target code 104 for the call, resolver 114 generates resolve stub 112. Resolve stub 112 maintains a record of additional contexts for subsequent calls from the call site, other than the context that is maintained in dispatch stub 110. Resolve stub 112 is discussed in additional detail below with reference to FIG. 3 (act 210).

Generic resolver 114 also generates dispatch stub 110 having the context of the call and a pointer to the target code that was determined in act 208 (act 212). Dispatch stub 110 is thus configured or "hard-wired" to associate the call site having a particular context (which is the context of the call site the first time it is executed) with the appropriate target code 104 for that context. Dispatch stub 110 maintains this single context and associated target code 104 for that context. Dispatch stub 110 is, for example, a set of instructions that include as data the context of the call and the pointer to the target code that was determined in act 208, and/or pointers to or identifiers of the context of the call and the pointer to the target code that was determined in act 208.

Generic resolver 114 also changes indirect cell 106 to point to dispatch stub 110 (act 214). Thus, the next time that the call site is executed, indirect cell 106 will point to dispatch stub 110 to be executed rather than lookup stub 108. Generic resolver 114 then begins executing the proper target code for this context as was determined in act 208 (act 216). For example, resolver 114 may execute a jump instruction to the target code determined in act 208.

In FIG. 3, process 250 is shown illustrating the example operation of system 100 the second and subsequent times that the call site is executed. Initially, the call is received from the call site (act 252). When the call is made, the operating system accesses indirect cell 106 to identify one of stubs 108, 110, and 112. The second and subsequent times that a call site is executed, indirect cell 106 points to dispatch stub 110, so indirect cell 106 invokes dispatch stub 110 (act 254). Indirect cell 106 can be, for example, a pointer to dispatch stub 110 so that execution of dispatch stub 110 begins in response to the call being received from the call site.

Dispatch stub 110 compares the context of the call received in act 252 with the context that stub 110 is configured with (act 256). This context that stub 110 is configured with is the context that stub 110 was configured with by generic resolver 114 in act 210 of FIG. 2.

Process 250 then proceeds based on whether the comparison results in a match (act 258). If the context of the call received in act 252 is the same as the context that stub 110 is configured with, then the comparison results in a match. Otherwise, the comparison does not result in a match.

If the comparison results in a match, then dispatch stub 110 begins executing the target code pointed to by dispatch stub 110 (act 260). For example, dispatch stub 110 may execute a jump instruction to the target code pointed to by stub 110.

Returning to act 258, if the comparison does not result in a match, then dispatch stub 110 invokes resolve stub 112, which checks whether it has a cache entry for the context (act 262). Resolve stub 112 maintains a cache of contexts and associated pointers to target code for contexts of the call site other than (or in addition to) the context maintained by dispatch stub 110. These contexts of the call site other than the context maintained by dispatch stub 110 are contexts of calls that were received by system 100 the second and/or subsequent times that the call site was executed. If resolve stub 112 has a cache entry with a context that is the same as the context of the call received in act 252, then resolve stub 112 does have a cache entry for the context. Otherwise, resolve stub 112 does not have a cache entry for the context.

Resolve stub 112 maintains a hash table, which associates a hash value of the context to a location in the cache region of memory. When resolve stub 112 is invoked, it generates a hash value for the context of the call that was received from the call site. This hash value can be generated using any of a variety of conventional hash functions, and is generated using the same hash function as is used by generic resolver 114 when adding cache entries.

The hash table maps hash values to memory locations in a cache region of memory. Resolve stub 112 indexes into the hash table using the hash value it generates, and identifies a memory location mapped to by that hash value. If the hash value is not present in the hash table, then resolve stub 112 knows that it has no cache entry for the context. However, if the hash value is present in the hash table, then resolve stub 112 accesses the memory location mapped to that hash value and retrieves the context and associated pointer to target code stored at that memory location. Resolve stub 112 then checks whether the context of the call received in act 252 is the same as the context that was received from that memory location. If the context of the call received in act 252 is the same as the context that was received from that memory location, then resolve stub 112 has a cache entry for the context (this is the cache entry that was retrieved from the memory location mapped to by the hash value). Otherwise, resolve stub 112 has no cache entry for the context.

Process 250 then proceeds based on whether resolve stub 112 has a cache entry for the context (act 264). If resolve stub 112 has a cache entry for the context, then resolve stub 112 begins executing the target code pointed to by the cache entry for the context (act 266). For example, resolve stub 112 may execute a jump instruction to the target code pointed to by the cache entry.

Returning to act 264, if resolve stub 112 does not have a cache entry for the context, then resolve stub 112 invokes generic resolver 114, which determines the target code for the call based on the context of the call (act 268). This determination is performed by generic resolver 114 in the same manner as discussed above with reference to act 208 of FIG. 2.

Once generic resolver 114 identifies the proper target code 104 for the call, resolver 114 adds a cache entry to the cache region of memory, storing the context of the call and a pointer to the proper target code 104 for the call in a particular location in the cache region of memory (act 270). Generic resolver 114 also generates a hash value for the context of the call (or alternatively relies on the hash value previously generated by resolve stub 112 in act 262), and adds a hash table entry to the hash table of resolve stub 112. This hash table entry maps the hash value of the context of the call to the particular location in the cache region of memory where the cache entry was stored in act 270.

Generic resolver 114 then begins executing the proper target code for this context as was determined in act 268 (act 272). For example, resolver 114 may execute a jump instruction to the target code determined in act 268.

Thus, as can be seen in FIGS. 2 and 3, system 100 stores the proper target code 104 for the context of the call site the first time the call site is executed. Dispatch stub 110 maintains this context and a pointer to the proper target code 104 for that context so that any subsequent execution of that call site with the same context can result in quick execution of the proper target code 104. For the second and subsequent times that the call site is executed with a different context, that context is determined by resolve stub 112 based on the information it caches, or is determined by generic resolver 114.

Resolve stub 112 can maintain its cache in any of a variety of manners. In certain implementations, the cache is a region of memory that is accessible to resolve stub 112 of system 100, as well as additional resolve stubs of additional systems 100 that correspond to different call sites in caller 102. Thus, the resolve stubs for multiple call sites in caller 102 share the same region of memory for caching entries. Alternatively, each resolve stub 112 may have its own region of memory for its cache entries.

In certain situations, dispatch stub 110 and/or resolve stub 112 may be pre-populated with contexts and associated pointers to target code. This pre-population could be performed, for example, by profiling the operation of caller 102, such as during usage of caller 102 by its intended users or in its intended environment, or by simulating usage of caller 102. By profiling the operation of caller 102, information regarding the call site contexts can be gathered and used to pre-populate stub 110 and/or stub 112 with data. Whichever component creates dispatch stub 110 and/or resolve stub 112 (e.g., generic resolver 114) would also be configured with, or have access to, the data to be used to pre-populate the stub(s) with data. Thus, when the stub(s) are created, they can be immediately populated with such data.

For example, if the profiling determined that one particular context was used more frequently than any other context for a particular call site, then dispatch stub 110 for that call site could be pre-populated with that context and a pointer to the proper target code for that context. The particular data to use to pre-populate the stubs can vary. If it is desired to improve long-term runtime performance, then dispatch stub 110 would be pre-populated with a pointer to the proper target code for the most frequently used context (without regard for whether it is the context used the first time that the call site is executed). On the other hand, if it is desired to improve startup performance, then dispatch stub 110 would be pre-populated with a pointer to the proper target code for the context of the first call expected to be made from the call site. It should also be noted that in situations where dispatch stub 110 is pre-populated with a context and pointer to target code, indirect cell 106 would initially point to dispatch stub 110 rather than lookup stub 108. Additionally, in such situations system 100 need not include lookup stub 108.

By way of another example, if the profiling determined that several different contexts were used for a particular call site, then cache entries could be created for resolve stub 112 that include each of these several contexts as well as pointers to the proper target code for each of these several contexts. Thus, during operation of system 100, the first time that one of these pointers is encountered resolve stub 112 will have a cache entry for the context and need not invoke generic resolver 114.

Additionally, in certain embodiments indirect cell 106 may be changed to point to resolve stub 112 rather than dispatch stub 110, thereby bypassing dispatch stub 110 during operation. Such a change could be made, for example, in situations where the context maintained by dispatch stub 110 is frequently not matching the context of the received call. For example, a determination may be made as to the frequency with which the context maintained by dispatch stub 110 is not matching the context of the received call and this frequency compared with a threshold frequency. If the frequency with which the context maintained by dispatch stub 110 is not matching the context of the received call exceeds the threshold frequency (e.g., 50%, indicating that less than 50% of the context comparisons made by dispatch stub 110 result in a match), then dispatch stub 110 is frequently not matching the context of the received call. In such situations indirect cell 106 can be changed to point to resolve stub 112 so that the time and effort of checking for a match that is unlikely to be successful is not expended. In such situations, the context and associated pointer to target code maintained in dispatch stub 110 may also be maintained in a cache entry of resolve stub 112.

The frequency with which the context maintained by dispatch stub 110 is not matching the context of the received call can be determined in different ways. In certain embodiments, resolve stub 112 determines this frequency. Resolve stub 112 can maintain a count of how frequently it is called from dispatch stub 110. This count can be used to determine how frequently dispatch stub 110 is not matching the context of the received call. For example, resolve stub 112 may have is multiple entrypoints—one for indirect cell 106 and one for dispatch stub 110. A counter is associated with the entrypoint for dispatch stub 110 and is incremented each time dispatch stub 110 invokes resolve stub 112. An additional counter may also be used that is incremented each time resolve stub 112 is invoked (regardless of which entrypoint is used), thereby allowing resolve stub 112 to determine what percentage of the calls are not having their contexts matched by dispatch stub 110.

Furthermore, in the discussions above, process 200 of FIG. 2 is discussed as being performed the first time that a call site is executed. Alternatively, in certain embodiments process 200 may be performed the second or subsequent times that a call site is executed, and another method, such as process 250 of FIG. 3, may be performed for the first time and any other times that a call site is executed prior to process 200 being performed.

Additionally, in the discussions above, a separate system 100 is discussed as being created for each call site in caller 102. Alternatively, in situations where multiple call sites in caller 102 are the same (e.g., calling the same virtual method on the same object), then one or more of lookup stub 108, dispatch stub 110, resolve stub 112, and generic resolver 114 can be shared by all of these multiple call sites. It should also be noted that each of stubs 108-112 and resolver 114 can be shared separately by different systems 100. For example, resolver 114 may be shared by all of the systems 100, lookup stub 108 may be shared by five different systems 100, dispatch stub 110 may be shared by three different systems 100, and each system 100 may have its own resolve stub 112 so that stub 112 is not shared by any systems 100.

Thus, it can be seen that the dynamic call site binding of system 100 can reduce storage space requirements while at the same time increasing processing performance when calls from a particular call site have the same context. If the context is the same for each call, then dispatch stub 110 is used each time to determine the proper target code. No additional analysis by generic resolver 114 is necessary, and the caching by resolve stub 112 of a large amount of pointers to target code for contexts that are not used from the call site is not necessary.

Additionally, in situations where the context is not the same each time the call is made, the dynamic call site binding of system 100 still reduces the storage space requirements. Pointers to the proper target code for each of the contexts that are used for the call site are maintained by resolve stub 112. This alleviates the need for a lookup to be performed by generic resolver 114 each time a context is repeated. This also alleviates the need for pointers to the proper target code for the contexts that are not used from the call site from being maintained by resolve stub 112; rather, the pointers to the proper target code for only the contexts that are used from the call site are maintained.

The discussions above regarding system 100 describe primarily generation of stubs at runtime. Generally, however, stubs can be generated at any point of the compilation and runtime process, and there are advantages and disadvantages to any of these points. For example, by generating the stubs at compilation time, more stubs than are actually used at runtime may be generated, but these stubs can be created up front and be ready for use immediately at runtime. Conversely, generating stubs at runtime can avoid producing unused stubs, but may take additional time during runtime because the work is being done at runtime rather than up front at compilation time. Additionally, a combination of stub generation at compilation time and runtime may be used to create hybrids that may use any of various sources of information such as profiling data to take advantage of the benefits of stub generation at these different times.

The following is an additional example of an alternate dynamic call site binding system in which stubs are generated at compilation time instead of runtime. During compilation, dispatch stubs could be created and added to the beginning of the target method (the target code) itself. Thus, the target method would have two entrypoints: the virtual dispatch entrypoint (the dispatch stub) and the non-virtual dispatch entrypoint (used when the compiler wishes to call the target method directly with no dispatch virtualization). The dispatch stub at the beginning of this method would perform the standard check as discussed above for dispatch stubs, and should the check fail, the stub would transfer control to the resolve stub. If the check passed, instruction flow would move directly into the method body itself, which would be the target code pointed to by the dispatch stub. The resolve stub could also be generated at compilation time, and would be associated with a type rather than a method. To accomplish this, the resolve stub would be responsible for dispatch of all virtual methods that the associated type introduced or overrode. The resolve stub would do this, for example, by keeping a list of such methods and associated target code, and comparing each of these methods in the list with the desired method. Upon a match, the resolve stub would jump to the target code associated with the matching method. If there was no such match (for example, if the method were implemented by a parent), then the resolve stub associated with the current type would transfer control to the resolve stub associated with the parent type, and repeat until a target was found.

Figure 4:
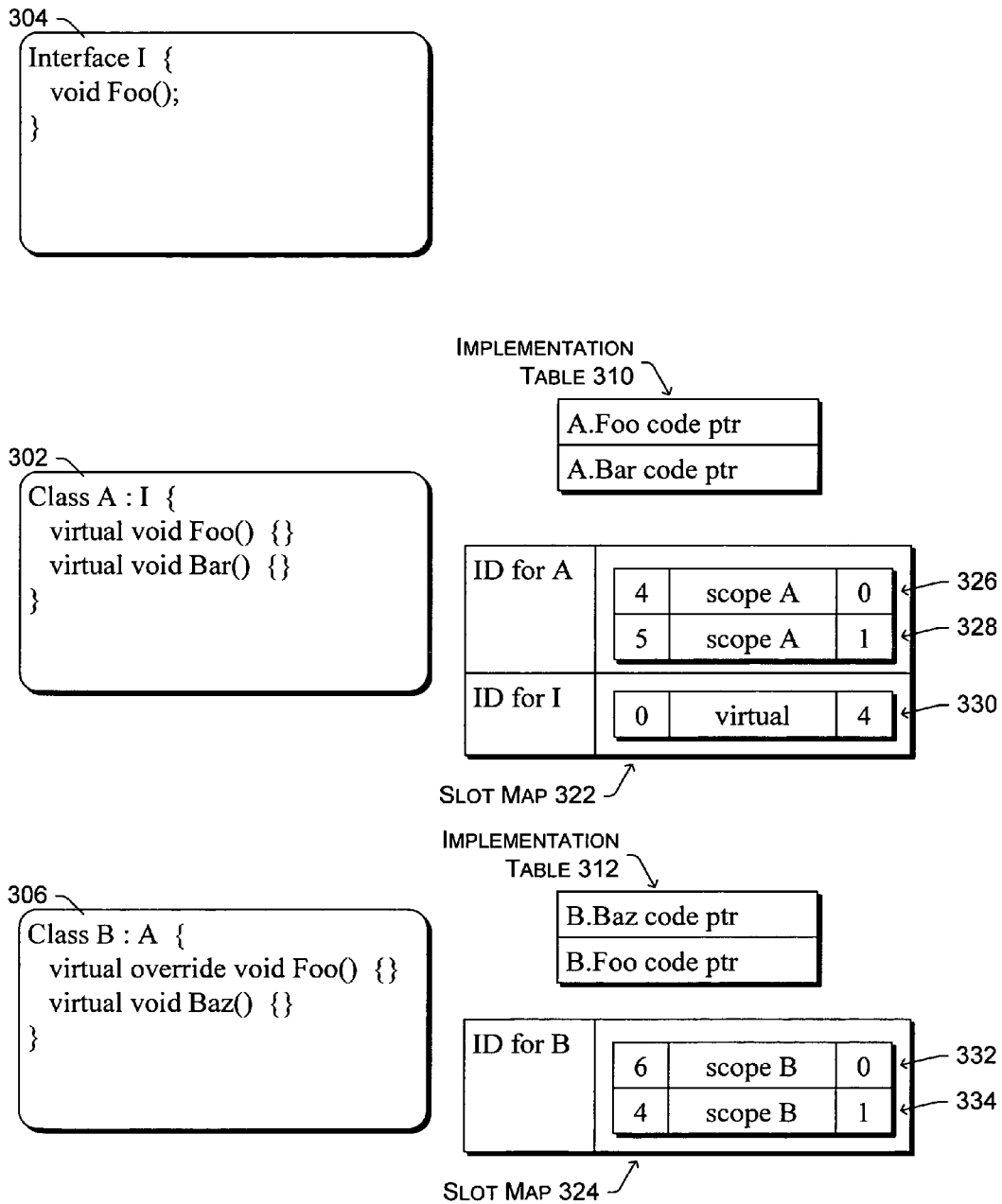
FIG. 4 illustrates an example of consolidation of a virtual table.

FIG. 4 illustrates an example of consolidation of a virtual table. It should be noted that the data structures illustrated in FIG. 4 are not a traditional virtual table. However, these data structures illustrated in FIG. 4 are more compacted, and require less storage, than a traditional virtual table, while at the same time storing the same information as is stored by a traditional virtual table. These data structures illustrated in FIG. 4 can be analyzed by generic resolver 114 of FIG. 1 to determine the target code for a call based on the context of the call.

In the discussions to follow, reference is made to methods and interfaces of a type. A method of a type refers to a method that is either defined by that type or is inherited by that type from a parent type. In many situations, an object or type is permitted to inherit from only one other object or type. In order to overcome this obstacle, interfaces are used. An interface describes a set of method definitions that are considered to be a contract, and a type implementing an interface states that it satisfies this contract, and does so by providing an implementation for every method contained within said contract. An interface is a way of stating that a type implements a set of functionality outside of the parent-child inheritance hierarchy.

As shown in the example of FIG. 4, a Class A 302 is a type that is defined as implementing an Interface I 304. Class A 302 declares a method Bar and a method Foo. Foo is also an implementation for Foo of the Interface I 304, and Bar is a new method defined by Class A 302. Class B 306 is a type that derives or inherits from Class A 302 and declares a method Foo and Baz. Foo is an override for method Foo of type A 302, which in turn is an implementation for Foo of the Interface I 304, and Baz is a new method defined by Class B 306.

For each type, there is an implementation table that includes a pointer to the code for each method introduced by the type, including both new methods as well as methods overriding methods of a parent type. This pointer to the code for a method is also referred to as the entry point for the method. Thus, implementation table 310 is associated with Class A 302, and thus with each object instantiated from Class A 302, and includes pointers to the code for the Foo implementation and the Bar method defined by Class A 302; and implementation table 312 is associated with Class B 306, and thus with each object instantiated from Class B 306, and includes pointers to the code overriding the Foo implementation and the Baz method defined by Class B 306.

Figure 5:
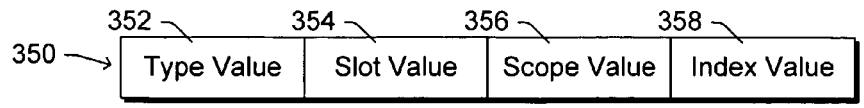
FIG. 5 illustrates an example slot map entry.

For each type, there is also an associated slot map having zero or more slot entries. An example slot map entry 350 is illustrated in FIG. 5. Each slot entry 350 includes a type value 352, a slot value 354, a scope value 356, and an index value 358. Type value 352 is an identifier of either the type that is associated with the slot map or an identifier for an interface that is implemented by the type. Slot value 354 is an identifier of a "slot" within the type that is associated with the type value 352. This "slot" refers to the slot value that the method would have within a traditional virtual table. However, as the dynamic call site binding discussed herein does not use traditional virtual tables, no such slot is actually present. Thus, the slot value 354 is also referred to as a conceptual slot.

Scope value 356 specifies whether the index value 358 is an implementation index or a slot number. An implementation index is a way of mapping to a slot in the implementation table that is associated with the same type as the slot map (and thus the slot map entry 350) is associated with or with a specific parent type; a slot number is a way of mapping from one conceptual slot to a different conceptual slot. For example, a particular value(s) (e.g., the value "virtual") is used to identify that index value 358 is a slot number, and another value is used to identify that index value 358 is an implementation index (e.g., the value "scope d", where d is an identifier of the type that is associated with the slot entry). For interfaces, index value 358 is a slot number, while for methods index value 358 is an implementation index. For a method, index value 358 is an identifier of a particular entry in the implementation table that is associated with the same type as the slot map is associated with, or a specific parent type. For an interface, index value 358 represents a conceptual slot in the context of the type associated with the dispatch map (i.e., this is used to create a new<type value 352, slot value 354>pair which is located anew in the dispatch map).

In situations where multiple slot map entries 350 are present having the same type value 352, these can be consolidated to share a single type value 352, but have separate values 354, 356, and 358. In such situations, each grouping of values 354, 356, and 358 is also referred to as a sub-map.

Returning to FIG. 4, slot map 322 is associated with Class A 302, and thus with any object instantiated from Class A 302. Slot map 322 includes three entries, two entries sharing a type value that identifies Class A 302, and one entry having a type value that identifies Interface I 304. Slot map 324 is associated with Class B 306, and thus with any object instantiated from Class B 306. Slot map 324 has two entries, each sharing a type value that identifies Class B 306.

In certain embodiments, every type implicitly derives or inherits from a standard "object" type that has one or more methods defined thereon. In the illustrated example of FIG. 4, this standard "object" type has four methods defined thereon. Thus, the first four values (0, 1, 2, and 3) in a traditional virtual table for each type would be used for these four methods. Thus, any new methods defined by an object would begin with a slot value of 4 or higher.

Looking at slot map 322, it can be seen that a slot entry 326 shares a type value that identifies Class A 302 that is associated with slot map 322, has a slot value of "4" (since slot entry 326 identifies the first method defined after the first four in the standard "object" type), has a scope value indicating that the index value is an index into the implementation table 310 for Class A 302, and has an index value of "0" (identifying the first entry (location 0) of the implementation table which is associated with the type identified in the scope value (that is, implementation table 310 which is associated with Class A 302)). Slot entry 328 shares the type value that identifies Class A 302 that is associated with slot map 322, has a slot value of "5" (since slot entry 328 identifies the second method defined after the first four in the standard "object" type), has a scope value indicating that the index value is an index into the implementation table 310 for Class A 302, and has an index value of "1" (identifying the second entry (location 1) of the implementation table which is associated with the type identified in the scope value (that is, implementation table 310 which is associated with Class A 302)).

Entry 330 of slot map 322 has a type value that identifies Interface I 304 (which is an interface that is implemented by Class A 302), a slot value of "0" (indicating that this is an implementation for the first method of interface I 304), a scope value indicating that the index value is a conceptual slot, and an index value identifying the new conceptual slot value with an implicit type value identifying Class A 302.

Looking at slot map 324, it can be seen that a slot entry 332 shares a type value that identifies Class B 306 that is associated with slot map 324, has a slot value of "6" (since slot entry 332 identifies the third method defined after the first four in the standard "object" type), has a scope value indicating that the index value is an index into the implementation table 312 for Class B 306, and has an index value of "0" (identifying the first entry (location 0) of the implementation table that is associated with the type identified in the scope value (that is, lo implementation table 312 which is associated with Class A 302)). Slot entry 334 shares a type value that identifies Class B 306 that is associated with slot map 324, has a slot value of "4" (since slot entry 334 identifies a method that overrides the first method defined in Class A 302 after the first four in the standard "object" type), has a scope value indicating that the index value is an index into the implementation table 312 for Class B 306, and has an index value of "1" (identifying the second entry (location 1) of the implementation table that is associated with the type identified in the scope value (that is, implementation table 312 which is associated with Class A 302)).

The use of the implementation tables and slot maps illustrated in FIG. 4, can be seen from the following examples. Assume that a request is made by a caller (e.g., caller 102 of FIG. 1) to invoke the Bar method on an object instantiated from Class B 306 (e.g., B.Bar). In order to determine the proper target code to execute for the Bar method, the data structures illustrated in FIG. 4 are analyzed (e.g., by generic resolver 114 of FIG. 1) to determine a pointer to the proper target code to execute. In response to the request, the operating system begins looking for a slot map entry for a method having a slot value of 5 (the method Bar having been associated with slot 5 when type A was created). Slot map 324 is checked, but there is no slot value 5 for the type ID associated with A listed in slot map 324, so slot map 322 is checked. Slot value 5 is listed in slot map 322 in slot entry 328, and an index value of "1" in slot entry 328 identifies the second entry in implementation table 310. This second entry includes a pointer to the code for the Bar method. So, this pointer is followed to find the proper target code to execute for the Bar method on the object.

By way of another example, assume that a request is made by a caller (e.g., caller 102 of FIG. 1) to invoke the I.Foo method on an object instantiated from Class B 306. In response to the request, the operating system begins looking for a slot map entry for an interface having an ID value corresponding to I and a slot value of 0 (which corresponds to the first method of I 304, which is Foo). Slot map 324 is checked, but there is no slot value 0 listed for Interface I in slot map 324, so slot map 322 is checked. Slot value 0 for Interface I is listed in slot map 322 in slot entry 330, and a slot value of "0" in slot entry 330 identifies another slot map entry having a slot value of 4. The operating system then begins looking for slot value 4, starting with slot map 324 again. Slot value 4 is listed in slot map 324 in slot entry 334, and an index value of "1" in slot entry 334 identifies the second entry in implementation table 312. This second entry includes a pointer to the code for the Foo method. So, this pointer is followed to find the proper target code to execute for the Foo method on the object.

Thus, as can be seen from the previous example, when the code for the method Foo is overridden by Class B 306, the proper code is executed even though the interface I 304 is included in the slot map of Class A 302 (and was defined prior to the method Foo being overridden).

Additionally, although slot maps are illustrated as being associated with each type in FIG. 4, in certain embodiments some slot entries or even entire slot maps are not necessary. In such embodiments, slot entries for new methods defined by a type do not need to be included in the slot map for that type.

This is because the conceptual slot number for these new methods are implied based on the ordering of the new methods in the implementation table associated with that type, as well as any new methods defined in the inheritance hierarchy of that type. For example, looking at implementation table 310, it is implied that the method Foo will have conceptual slot 4 because it is the first method defined in implementation table 310 after the first four in the standard "object" type. By way of another example, looking at implementation table 312, it is implied that the method Baz will have conceptual slot 6 because it is the seventh method defined (the first four being defined in the standard "object" type, and the next two being defined in Class A). However, in such embodiments, slot entries are still maintained for interfaces (where the index value 358 of FIG. 5 is an implementation index) as well as methods that override previous methods.

Figure 6:
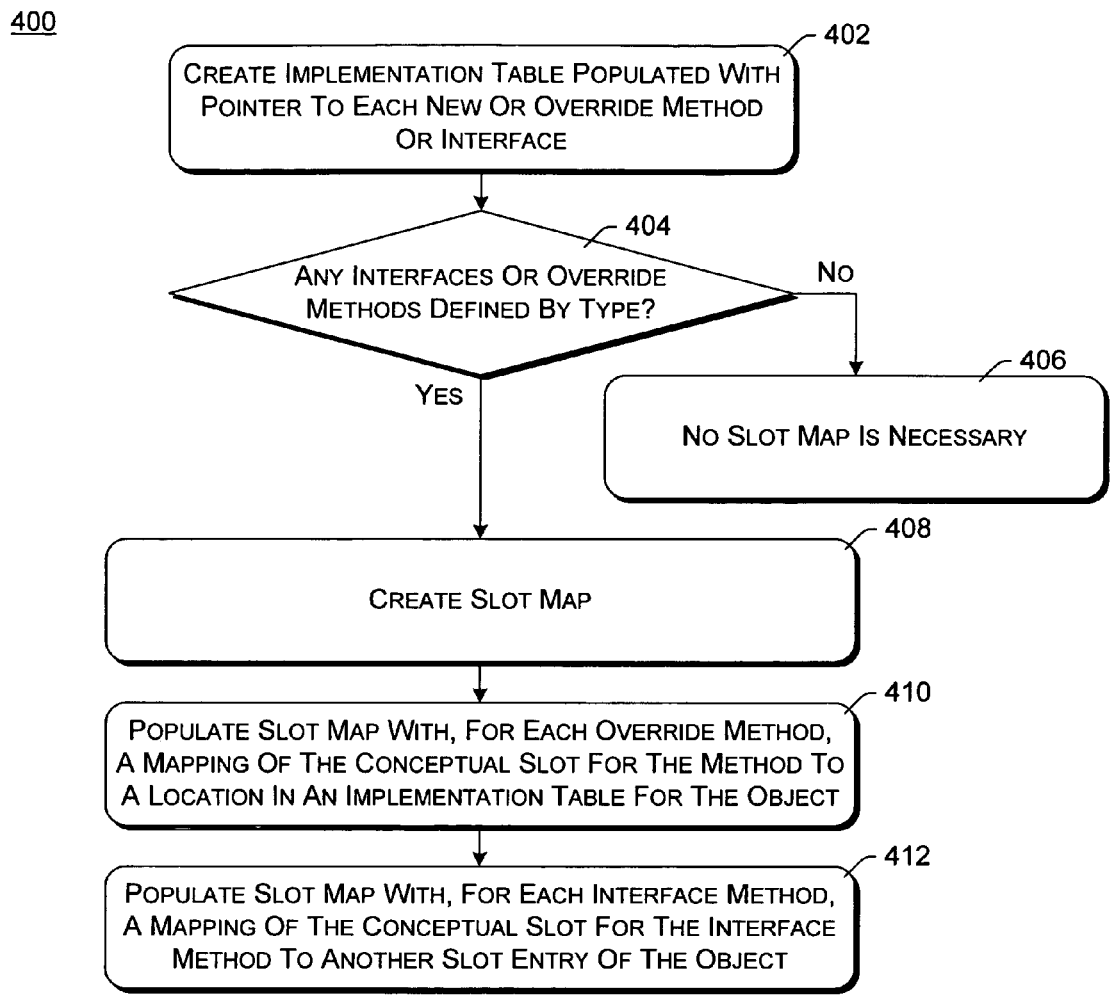
FIG. 6 is a flowchart illustrating an example process for creating implementation tables and slot maps.

FIG. 6 is a flowchart illustrating an example process 400 for creating implementation tables and slot maps. Process 400 is typically performed in software, although alternatively it may be performed in firmware, hardware, or a combination of software, firmware, and/or hardware. Process 400 is typically carried out by an operating system when the first object from a particular type or class is created or instantiated, although process 400 may alternatively be performed by other components of a computing device and/or at other times.

Initially, an implementation table populated with a pointer to each new or override method or interface defined by the type is created (act 402). This implementation table may optionally include other pointers, such as a pointer to a constructor method defined by the type. A check is then made as to whether there are any interfaces or overriding methods defined by the type (act 404). If there are no interfaces and no overriding methods defined by the type, then no slot map need be created (act 406). As discussed above, slot entries need not be created for new methods, so if only new methods are defined in the type then no slot map need be created.

However, if there is at least one interface or overriding method defined in the type, then a slot map associated with the type is created (act 408). The slot map is then populated with, for each override method, a mapping of the conceptual slot (the slot value) for the method to a location in an implementation table for the type (act 410). This mapping in act 410, as discussed above, is a mapping of the slot value to the location in the implementation table where there is a pointer to the code for the method. Additionally, the slot map is populated with, for each interface method, a mapping of the conceptual slot (the slot value) for the interface method to another conceptual slot entry of the type (act 412). This mapping in act 412, as discussed above, is a mapping to another slot entry, this other slot entry being a mapping of the conceptual slot to the location in the implementation table where a pointer to the code for the interface.

Figure 7:
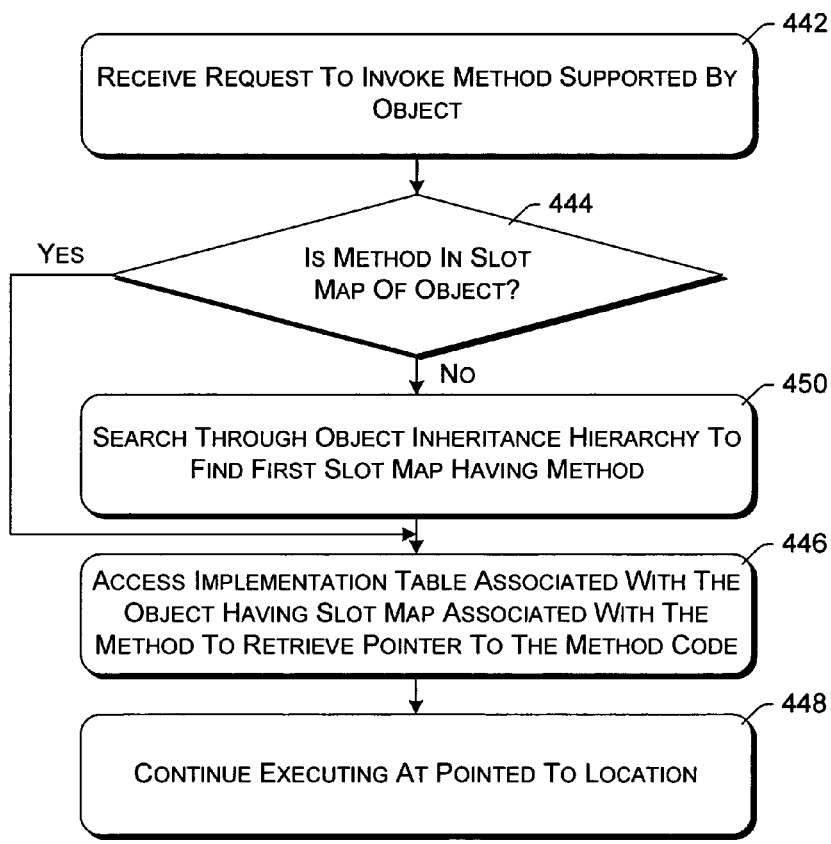
FIG. 7 is a flowchart illustrating an example process for using the implementation table and slot maps to lookup a requested method.

FIG. 7 is a flowchart illustrating an example process 440 for using the implementation table and slot maps to lookup a requested method. Process 440 is typically performed in software, although alternatively it may be performed in firmware, hardware, or a combination of software, firmware, and/or hardware. Process 440 is typically carried out by an operating system, although process 440 may alternatively be performed by other components of a computing device.

Initially, a request to invoke a method supported by an object is received (act 442). A check is then made as to whether the method is in the slot map of that object (act 444). This slot map in act 444 is the slot map associated with the type of the object for which the request is received in act 442 was instantiated. If the method is in the slot map of the object, then the implementation table associated with that object (which has the slot map associated with the method) is accessed to retrieve a pointer to the method code (act 446). The requested method is then carried out by continuing execution of instructions at the pointed-to location, which is the entry point of the method (act 448). The pointed-to location can also be used, for example, by generic resolver 114 of FIG. 1 as a pointer to the target code for this particular call (virtual method invoked) on this particular object (the context of the call).

Returning to act 444, if the method is not in the slot map of the object, then a search through the type inheritance hierarchy (which can include the parent type of the type from which the object was created, the parent type of the parent type from which the object was created, and so forth) to find the first slot map having the method is performed (act 450). Once the slot map is found, process 440 continues with acts 446 and 448. If no slot map is found, then the method could not be found and an error is reported.

Figure 8:
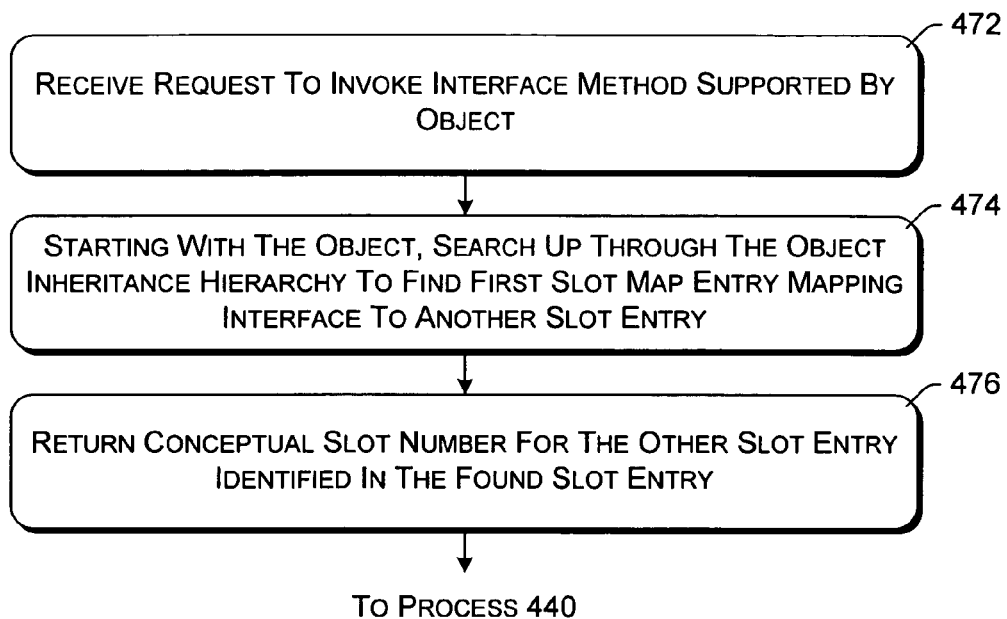
FIG. 8 is a flowchart illustrating an example process for using the implementation table and slot maps to lookup a requested interface.

FIG. 8 is a flowchart illustrating an example process 470 for using the implementation table and slot maps to lookup a requested interface. Process 470 is typically performed in software, although alternatively it may be performed in firmware, hardware, or a combination of software, firmware, and/or hardware. Process 470 is typically carried out by an operating system, although process 470 may alternatively be performed by other components of a computing device.

Initially, a request to invoke a method of an interface supported by an object is received (act 472). A search is then made, starting with the object for which the request is received in act 472, up through the object inheritance hierarchy to find the first slot map entry mapping the interface to another slot entry (act 474). The conceptual slot value for the other slot entry, as identified in the found slot entry, is then retrieved (act 476).

Once the conceptual slot value is retrieved in act 476, process 470 finishes by carrying out the same acts as process 440 of FIG. 7, with the method for which the request to invoke has been received being the method associated with the conceptual slot value retrieved in act 476.

In certain embodiments, the instructions that define and act on the various objects are compiled just prior to being needed, referred to as Just In Time (JIT) compilation. In other embodiments, the instructions that define and act on the various objects are compiled well in advance of their being needed and stored in compiled form so that they can be loaded when needed without requiring further compilation. These instructions are typically grouped together into modules and these modules are compiled as a single unit. However, one issue that arises in such embodiments is how to handle the various identifiers discussed above (e.g., identifiers of types or interfaces). For example, when the instructions for a particular module are compiled, it is not known what other objects or interfaces will have already been instantiated when the compiled instructions are actually executed, so it is not known what identifiers can be assigned in order to avoid conflicts with previously-assigned identifiers.

Such situations are resolved in certain implementations by compiling each ii module and assigning local identifiers as needed for the objects and interfaces in that module. As the modules are loaded during execution, global identifiers are assigned to the objects and interfaces, and a table is generated that maps the global identifiers to the local identifiers, and vice versa. This table can be indexed, for example, by the local identifiers so that a global identifier can be quickly determined given a particular local identifier. Alternatively, the table may be indexed by the global identifiers, or two mappings may be maintained with one being indexed by the local identifiers and the other being indexed by the global identifiers.

Figure 9:
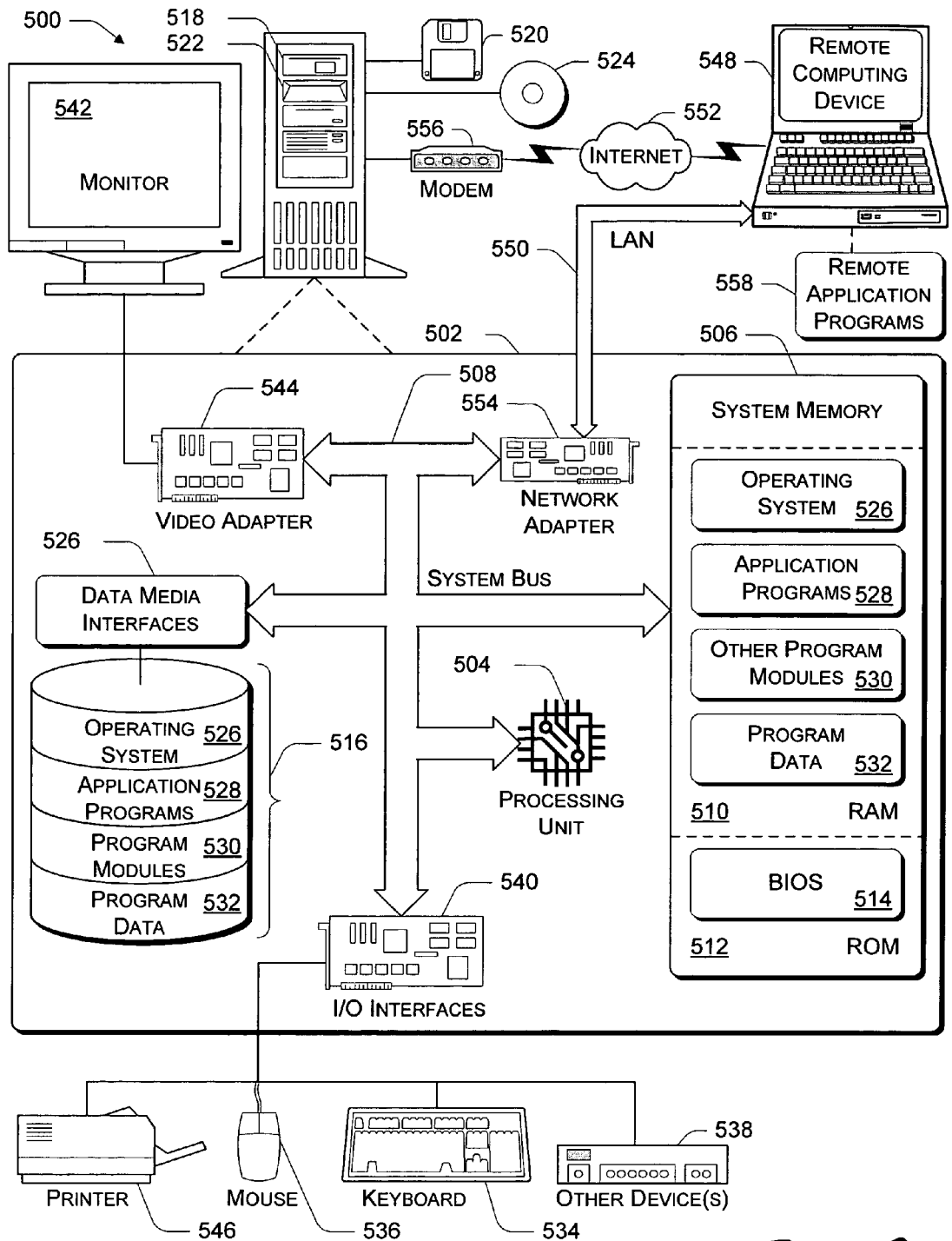
FIG. 9 illustrates an example general computer environment.

FIG. 9 illustrates a general computer environment 500, which can be used to implement the techniques described herein. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

Computer environment 500 includes a general-purpose computing device in the form of a computer 502. Computer 502 can be used to implement, for example, system 100 as well as the other components of FIG. 1. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 9 illustrates a hard disk drive 516 for reading from and writing to a non-removable, non-volatile magnetic media (not shown), a magnetic disk drive 532 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or it transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory, CD-ROM, digital versatile disks (DVD) or other optical storage, magnetic cassettes, magnetic tape, magnetic disk storage or other magnetic storage devices, or any other storage medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media having a tangible component and having stored thereon a plurality of instructions that, when executed by one or more processors of a device, causes the one or more processors to perform acts comprising:
receiving a call from a call site at a computer, the call site having a context;
　invoking, in response to the call, a dispatch stub, the dispatch stub checking whether the context of the call matches a single context which the dispatch stub is configured;
accessing, in an event the context of the call matches the single context, a first pointer which the dispatch stub is configured, the first pointer being a pointer to a first target code to be executed to carry out the call;
executing the first target code to carry out the call;
checking whether a frequency which the single context is not matching the contexts of calls received from the call site exceeds a threshold frequency;
in the event:
　the frequency which the single context is not matching the contexts of calls received from the call site exceeds the threshold frequency, then bypassing the dispatch stub and invoking, in response to the call, a resolve stub; or
　the context of the call does not match the single context, invoking the resolve stub, the resolve stub:
　　checking whether the context of the call matches one of one or more contexts maintained by the resolve stub, the resolve stub further maintaining an association of each context of the one or more contexts with a different target code;
　　accessing, in the event the context of the call matches one of the one or more contexts stored in the resolve stub, a second pointer to second target code to be executed to carry out the call; and
　　executing the second target code to carry out the call; and
invoking, in the event the context of the call does not match one of the one or more contexts stored in the resolve stub, a resolver to determine a third pointer to third target code to be executed to carry out the call, wherein:
　the resolver determines the third pointer to third target code to be executed to carry out the call by:
　　searching through an inheritance hierarchy that includes a type of an object on which the call is made, each type in the inheritance hierarchy including one or more implementation tables and one or more slot maps, the searching beginning with the type of the object and progressing in an order from child type to parent type until a first slot map is located, the first slot map comprising one or more entries, each entry comprising:
　　　a type value used as an identifier of either the type that is associated with the first slot map or an identifier for an interface method that is implemented by the type associated with the first slot map;
　　　a slot value that identifies a slot within the object that is associated with the type value;
　　　an index value representing a slot number used for an interface method that is implemented by the type or an implementation index used for a method implemented by the type; and
　　　a scope value that specifies whether the index value is the implementation index associated with an implementation table or a slot number associated with a conceptual slot;
in an event that the index value of a first entry is an implementation index associated with the implementation table:
　accessing the implementation table to retrieve the pointer to the third target code;
　retrieving, from the location of the implementation table, a pointer to code; and
　using the retrieved pointer to code as the third pointer;
in the event that the index value of the first entry is a slot number associated with the conceptual slot, mapping the conceptual slot for an interface method to a second entry having the type value to assist in retrieving a pointer to the third target code; and
　in response to the resolver identifying the third target code, the resolver:
　executes the third target code to carry out the call; and
　updates data of the resolve stub so that when a subsequent call from the call site having the context is received, the resolve stub executes the third target code to carry out the call without invoking the resolver, thereby facilitating virtual method dispatching.

2. The one or more computer readable storage media as recited in claim 1, wherein the resolver includes instructions to generate a cache entry associated with the context of the call.

3. The one or more computer readable storage media as recited in claim 2, wherein the instructions further cause the one or more processors to:
generate the cache entry only if the call is not the first call received from the call site.

4. The one or more computer readable storage media as recited in claim 1, wherein the context of the call comprises an object-oriented programming object.

5. The one or more computer readable storage media as recited in claim 1, wherein the call comprises a call to a virtual method.

6. The one or more computer readable storage media as recited in claim 1, wherein the instructions further cause the one or more processors to:
generate a hash value of the context of the call;
associate the hash value of the context with a location in a cache region of memory where the cache entry is saved; and
save, in a hash table associated with the call site, the hash value and an identifier of the location in the cache region of memory where the cache entry is saved.

7. The one or more computer readable storage media as recited in claim 1, wherein the plurality of instructions further cause the one or more processors to perform acts comprising:
checking whether there is at least one new or override method defined by the type; and creating the implementation table only if there is at least one new or override method defined by the type.

8. A method for facilitating virtual method dispatching utilizing one or more computers including one or more processors, the method comprising:
receiving a call from a call site, the call site having a context, wherein the context is stored in a computer readable storage media;
invoking, in response to the call, a dispatch stub, the dispatch stub checking whether the context of the call matches a single context with which the dispatch stub is configured;
accessing, in an event the context of the call matches the single context, a first pointer with which the dispatch stub is configured, the first pointer being a pointer to a first target code to be executed to carry out the call; and
executing the first target code to carry out the call; or
checking whether a frequency with which the single context is not matching the contexts of calls received from the call site exceeds a threshold frequency;
in an event:
the frequency with which the single context is not matching the contexts of calls received from the call site exceeds the threshold frequency, then bypassing the dispatch stub and invoking, in response to the call, a resolve stub; or
the context of the call does not match the single context, invoking the resolve stub, the resolve stub:
checking whether the context of the call matches one of one or more contexts maintained by the resolve stub, the resolve stub further maintaining an association of each context of the one or more contexts with a different target code;
accessing, in the event the context of the call matches one of the one or more contexts stored in the resolve stub, a second pointer to second target code to be executed to carry out the call; and
executing the second target code to carry out the call; or
invoking, in an event the context of the call does not match one of the one or more contexts stored in the resolve stub, a resolver to determine a third pointer to a third target code to be executed to carry out the call, wherein:
the resolver determines the third pointer to third target code to be executed to carry out the call by:
searching through an inheritance hierarchy that includes a type of an object on which the call is made, each type in the inheritance hierarchy including one or more implementation tables and one or more slot maps, the searching beginning with the type of the object and progressing in an order from child type to parent type until a first slot map is located, the first slot map comprising one or more entries, each entry comprising:
a type value used as an identifier of either the type that is associated with the first slot map or an identifier for an interface method that is implemented by the type associated with the first slot map;
a slot value that identifies a slot within the object that is associated with the type value;
an index value representing a slot number used for an interface method that is implemented by the type or an implementation index used for a method implemented by the type; and
a scope value that specifies whether the index value is an implementation index associated with the implementation table or a slot number associated with a conceptual slot;
in an event that the index value of a first entry is an implementation index associated with the implementation table:
accessing the implementation table to retrieve the pointer to the third target code;
retrieving, from the location of the implementation table, a pointer to code; and
using the retrieved pointer to code as the third pointer;
in an event that the index value of the first entry is a slot number associated with a conceptual slot, mapping the conceptual slot for an interface method to a second entry having the type value to assist in retrieving the pointer to the third target code; and
in response to the resolver identifying the third target code, the resolver:
executes the third target code to carry out the call; and
updates data of the resolve stub so that when a subsequent call from the call site having the context is received, the resolve stub executes the third target code to carry out the call without invoking the resolver, thereby facilitating virtual method dispatching.

9. The method as recited in claim 8, further comprising invoking, if the call is the first call received from the call site, a lookup stub, the lookup stub generating the resolve stub and generating the dispatch stub configured with a context of the first call as the single context and a pointer to target code to be executed to carry out the first call as the first pointer.

10. The method as recited in claim 8, wherein the context of the call comprises an object-oriented programming object.

11. The method as recited in claim 8, wherein the call comprises a call to a virtual method.

12. The method as recited in claim 8, further comprising:
invoking the dispatch stub only if the call is not the first call received from the call site;
invoking, if the call is the first call received from the call site, the resolver; and the resolver:
determining the first pointer based on the context of the call; and
generating the dispatch stub configured with the context of the call and the first pointer.

13. The method as recited in claim 8, further comprising:
the resolver adding, as one of the one or more contexts maintained by the resolve stub, the context of the call associated with the third target code.

14. The method as recited in claim 8, wherein the resolve stub checking whether the context of the call matches one of one or more contexts maintained by the resolve stub comprises the resolve stub:
generating a hash value of the context of the call;
accessing, to identify a memory location associated with the hash value, a hash table that stores context hash values associated with locations in a cache region of memory where pointers to target code are stored;
retrieving a cache entry from the memory location;
comparing a context from the cache entry with the context of the call; and if the context of the cache entry is the same as the context of the call, then determining that the context call matches one of the one or more contexts maintained by the resolve stub.

15. The method as recited in claim 8, further comprising:
jumping to the appropriate one of the first target code, the second target code, and the third target code to begin execution of code at the jumped to location to carry out the call.

16. A system comprising:
one or more processors;
a computer readable storage media;
a dispatch stub associated with a call site of a calling program, the dispatch stub:
being stored on the computer readable storage media executed by the one or more processors for:
storing a single context of a call and a pointer to target code to be executed when the call having the stored single context is received from the call site,
checking whether the context of the received call matches the single context with which the dispatch stub is configured;
a resolve stub associated with the call site, the resolve stub:
storing a plurality of additional contexts and, for each of the plurality of additional contexts, a pointer to different target code to be executed when the call is invoked from the call site with one of the additional contexts, and the resolve stub being configured to check whether the context of the received call matches one of the plurality of additional contexts stored in an event the context of the received call is not matched with the single context;
a lookup stub associated with the call site, the lookup stub including instructions to invoke a resolver in response to the call received from the call site, wherein the resolver includes instructions comprising:
in an event the context of the received call is not matched with the single context or the plurality of additional contexts, analyzing the context of the call and determining the proper target code for the call base upon the context of the call, wherein the analysis includes searching through an inheritance hierarchy that includes a type of an object on which the call is made, each type in the inheritance hierarchy including one or more implementation tables and one or more slot maps, the searching beginning with the type of the object and progressing in an order from child type to parent type until a first slot map is located, the first slot map including one or more entries, each entry comprising:
a type value used as an identifier of either the type that is associated with the slot map or an identifier for an interface method that is implemented by the type associated with the slot map;
a slot value that identifies a slot within an object that is associated with the type value;
an index value representing a slot number used for an interface method that is implemented by the type or an implementation index used for a method implemented by the type; and
a scope value that specifies whether the index value is an implementation index associated with implementation table or the slot number associated with a conceptual slot;
in the event that the index value of a first entry is the implementation index associated with the implementation table:
accessing the implementation table to retrieve the pointer to the proper target code; and
retrieving, from the location of the implementation table, the pointer to the proper target code; and
using the retrieved pointer to the proper target code;
in the event that the index value of the first entry is a slot number associated with a conceptual slot, mapping the conceptual slot for an interface method to a second entry having a type value to assist in retrieving different pointer to the proper target code; and
in response to the resolver identifying the proper target code, the resolver:
executes the proper target code to carry out the call; and
updates data of the resolve stub so that when a subsequent call from the call site having the context is received, the resolve stub executes the proper target code to carry out the call without invoking the resolver, thereby facilitating virtual method dispatching; and
an indirect cell associated with the call site, the indirect cell storing a pointer to the dispatch stub unless a frequency with which the single context stored in the dispatch stub is not matching the contexts of calls received from the call site exceeds a threshold frequency, and storing a pointer to the resolve stub if the frequency which the context stored in the dispatch stub is not matching the contexts of calls received from the call site exceeds the threshold frequency.

17. The system as recited in claim 16, wherein the indirect cell stores a pointer to the lookup stub until the first call is received from the call site, and storing a pointer to the dispatch stub after the first call is received from the call site.

18. The system as recited in claim 16, wherein the call comprises a call to a virtual method.

19. The system as recited in claim 16, wherein the context of the call and each of the plurality of additional contexts each comprise an object-oriented programming object.

* * * * *